M. RYAN.
HEAT CONDUCTOR AND RADIATOR.
No. 10,543. Reissued Dec. 9, 1884.
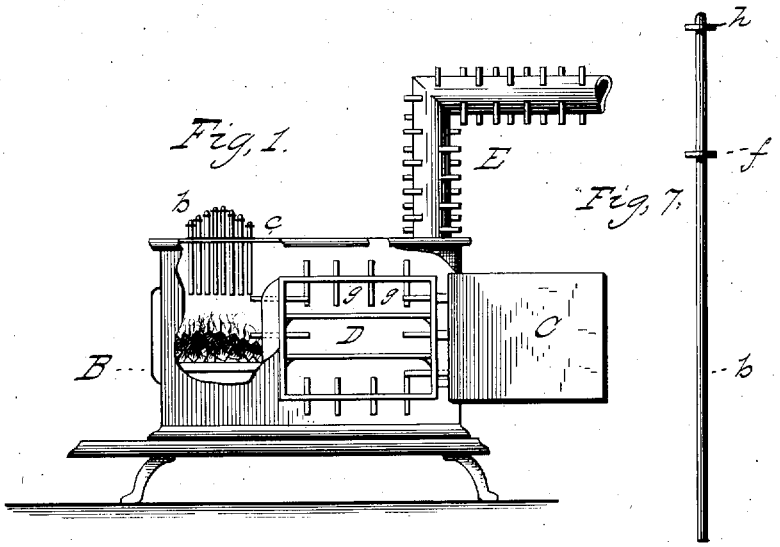
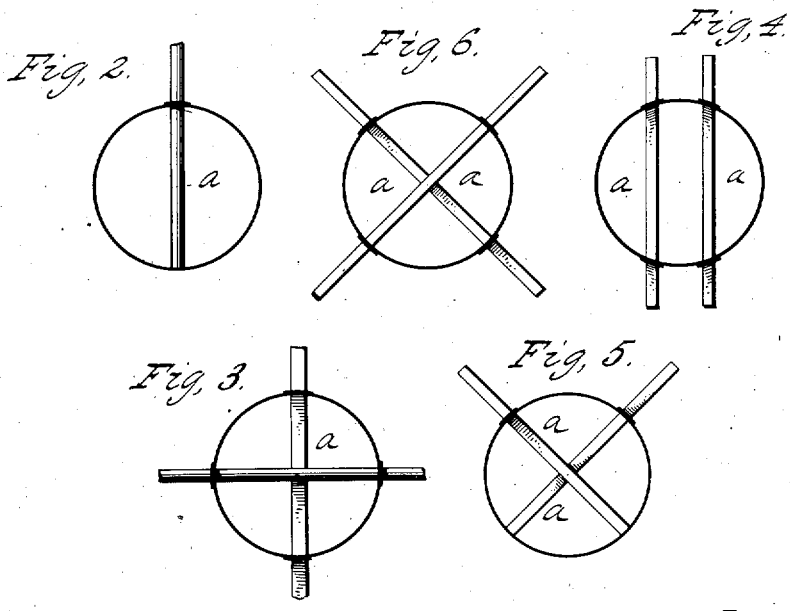
Witnesses:
Edward E. Ellis
J. F. White.
Inventor:
Matthew Ryan
By O. E. Duffy
Atty.

UNITED STATES PATENT OFFICE.

MATTHEW RYAN, OF WASHINGTON, DISTRICT OF COLUMBIA.

HEAT CONDUCTOR AND RADIATOR.

SPECIFICATION forming part of Reissued Letters Patent No. 10,543, dated December 9, 1884.

Original No. 305,713, dated September 23, 1884. Application for reissue filed October 18, 1884.

*To all whom it may concern:*

Be it known that I, MATTHEW RYAN, of Washington, in the District of Columbia, have invented certain new and useful Improvements in Heat Conductors and Radiators; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to improved means for utilizing the heat emanating from fuel in combustion and the waste gases proceeding therefrom.

It consists in the combination, with the discharge-flue of a stove or furnace, of a series of metallic rods or bars extending completely through the portion of said flue of the greatest degree of temperature and outwardly into the space to be heated, whereby the absorbing surface of the said bars or rods is interposed directly in the path of the most highly heated of the outgoing products of combustion.

My invention further consists in certain details of construction and dispositions of parts more particularly pointed out in the claim hereunto annexed.

Referring to the drawings forming part of this specification, and to the letters of reference marked thereon, Figure 1 represents in elevation, partly in section, a cooking and baking stove fitted with a stove-pipe, to which my invention is applied. Figs. 2, 3, 4, 5, and 6 represent in plan and cross-section details of my invention. Fig. 7 is an elevation of a stove-plate rod.

In Fig. 1, B represents a cooking-stove, a part thereof being broken away in order to disclose the interior disposition of parts. The stove is provided with the closing-lid *c*, which is provided with perforations of appropriate number, size, and arrangement, designed for the reception of a series of rods. The latter should be made of material having high heat-conducting powers, and will in most cases be of metal, although other substances having similar properties—such as porcelain—may be usefully employed. For purposes of economy, however, the rods may be of cast-iron, and preferably of the cylindrical form shown in Fig. 7. The downward movement of the rods is limited by means of the fixed collar *f*, the top terminating in an ornamental button, *h*. The rods are intended to fit the perforations with a degree of friction sufficient to sustain them at any desired height. In view of this fact it is evident that the lid and rods, respectively, should be made of material having substantially the same expansibility when exposed to heat. Thus, if the rod expanded more with the same heat than the lid, the latter would be liable to break. On the other hand, if the lid has greater expansibility, the diameter of the perforations would increase in greater proportion than that of the rods, and would no longer retain them in position. The rods being inserted in the perforated cover, as shown, the latter is placed upon the stove. The lower ends of the rods approach the zone of combustion and receive and communicate to the outer ends, and thence to the apartment in which the stove is situated, the heat absorbed from the fire.

The stove is provided with the elbow-pipe E, perforated at diametrically-opposite points, as shown in Figs. 3 and 6, at points not diametrically opposite, as in Fig. 4, at a single point, as in Fig. 2, or as in Fig. 5. In these perforations I insert rods *a*, of a similar material to that used for the rods *b*, and I provide these rods with suitable washers, to prevent escape of the products of combustion into the apartment.

The number and arrangement of rods in the stove-pipe will lie largely in the discretion of the constructer. They should not materially interfere with a proper draft for the fire. I have found on actual experiment that under ordinary conditions they can be arranged at distances of approximately six inches apart along the length of the pipe and a good working draft maintained in the stove.

In Fig. 1 the rods are shown applied to the oven, and they may be either inserted in perforations made in the oven-walls or may be cast integral therewith.

I am aware that it has been heretofore proposed to utilize waste heat by means of rods or plates projecting from the exterior walls of escape-flues and partially penetrating the interior of the latter, as shown substantially in the drawings by rods *b* and *g*. In all of these arrangements, however, the region of greatest heat (which in vertical pipes is directly in the center and in horizontal pipes is in their upper portion) has not been reached by the conducting material. The consequence is that only the waste heat has been saved present in the cooler portions of the escaping products immediately adjoining the vertical walls. In my invention, on the contrary, the conductors pass directly through the hottest path of the outgoing gases, taking up and transmitting almost the entire quantity of the waste heat.

Having thus described my invention, what I claim is—

The combination, with the discharge-flue of a stove or furnace, of a series of metallic rods or bars extending completely through the hottest portion of said flue, and outwardly into the room to be heated, whereby the absorbing-surface of the said bars or rods is interposed directly in the path of the most highly heated of the outgoing products of combustion, substantially as shown and described.

In testimony whereof I affix my signature in presence of two witnesses.

MATTHEW RYAN.

Witnesses:
EDWARD E. ELLIS,
J. F. WHITE.